(12) United States Patent
Hosomi

(10) Patent No.: US 12,451,130 B2
(45) Date of Patent: Oct. 21, 2025

(54) INFORMATION PROCESSING APPARATUS, INFORMATION PROCESSING METHOD, MOBILE OBJECT CONTROL DEVICE, AND MOBILE OBJECT CONTROL METHOD

(71) Applicant: HONDA MOTOR CO., LTD., Tokyo (JP)

(72) Inventor: Naoki Hosomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 272 days.

(21) Appl. No.: 17/695,358

(22) Filed: Mar. 15, 2022

(65) Prior Publication Data
US 2022/0319514 A1 Oct. 6, 2022

(30) Foreign Application Priority Data
Mar. 30, 2021 (JP) .................................. 2021-058446

(51) Int. Cl.
| | |
|---|---|
| G10L 15/22 | (2006.01) |
| G06F 18/20 | (2023.01) |
| G06Q 50/40 | (2024.01) |
| G10L 15/14 | (2006.01) |

(52) U.S. Cl.
CPC ............ *G10L 15/22* (2013.01); *G06F 18/285* (2023.01); *G06Q 50/40* (2024.01); *G10L 15/142* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 11,318,935 B2 | 5/2022 | Kindo | |
| 11,715,111 B2 * | 8/2023 | Teo | G06Q 30/016 |
| | | | 705/304 |
| 2019/0243899 A1 * | 8/2019 | Yi | G06F 16/00 |
| 2020/0334539 A1 * | 10/2020 | Wang | G06N 20/20 |

(Continued)

FOREIGN PATENT DOCUMENTS

| | | | | |
|---|---|---|---|---|
| CN | 109688512 A * | 4/2019 | | H04R 1/326 |
| CN | 109710941 A | 5/2019 | | |

(Continued)

OTHER PUBLICATIONS

Qian Chen et al., BERT for Joint Intent Classification and Slot Filling, Feb. 28, 2019, arXiv:1902.10909v1, Speech Lab, DAMO Academy, Alibaba Group, pp. 1-6, published on the Internet at https://arxiv.org/pdf/1902.10909.pdf.

(Continued)

*Primary Examiner* — Jialong He
(74) *Attorney, Agent, or Firm* — Thomas Horstemeyer, LLP

(57) ABSTRACT

An information processing apparatus capable of controlling a mobile object on the basis of an instruction by an utterance of a user identifies which scene a use scene of a target user is among a plurality of use scenes in a case where the mobile object is used, acquires utterance information of the target user, and selects a different machine learning model according to the identified use scene of the target user. The information processing apparatus estimates an intent of an utterance of the target user by using the selected machine learning model.

13 Claims, 9 Drawing Sheets

(56) References Cited

U.S. PATENT DOCUMENTS

2021/0107162 A1* 4/2021 Kim ..................... G06F 3/0482
2021/0350139 A1* 11/2021 Pardeshi ................. G06N 3/08

FOREIGN PATENT DOCUMENTS

| | | | | |
|---|---|---|---|---|
| CN | 111717217 A | | 9/2020 | |
| CN | 112009480 A | | 12/2020 | |
| CN | 112036550 A | | 12/2020 | |
| CN | 114945979 A | * | 8/2022 | ......... G06F 16/9038 |
| JP | 2000-020090 A | | 1/2000 | |
| JP | 2015-230384 A | | 12/2015 | |
| JP | 2018-045332 A | | 3/2018 | |
| KR | 20220118698 A | * | 8/2022 | |

OTHER PUBLICATIONS

Japanese Office Action for Japanese Patent Application No. 2021058446 mailed Sep. 20, 2024.
Chinese Office Action for Chinese Patent Application No. 202210248247.X mailed Jul. 1, 2025 (partially translated).

* cited by examiner

FIG. 5A

| USE SCENE | UTTERANCE INTENT CLASS | UTTERANCE EXAMPLE |
|---|---|---|
| BEFORE BOARDING | INQUIRY | CAN I BOARD ON VEHICLE NOW? |
| BEFORE BOARDING | PICK-UP REQUEST | PICK ME UP IN FRONT OF HOUSE |
| BEFORE BOARDING | GREETING | HELLO |
| DURING BOARDING | DESTINATION INSTRUCTION | I WANT TO GO TO SUSHI RESTAURANT |
| DURING BOARDING | ROUTE INSTRUCTION | TURN RIGHT |
| DURING BOARDING | STOP INSTRUCTION | STOP THERE |
| DURING BOARDING | ACCELERATION INSTRUCTION | INCREASE SPEED |
| DURING BOARDING | DECELERATION INSTRUCTION | REDUCE SPEED |
| AFTER ALIGHTING | STAND BY INSTRUCTION | STAND BY THERE |
| AFTER ALIGHTING | MOVEMENT INSTRUCTION | TRAVEL TO FRONT OF STORE A |
| AFTER ALIGHTING | RETURNING INSTRUCTION | OKAY TO GO HOME |
| AFTER ALIGHTING | TURN BACK INSTRUCTION | COME BACK HERE |
| ALWAYS | AGREE | YES |
| ALWAYS | DENIAL | NO |
| ALWAYS | ASK AGAIN | SAY AGAIN |

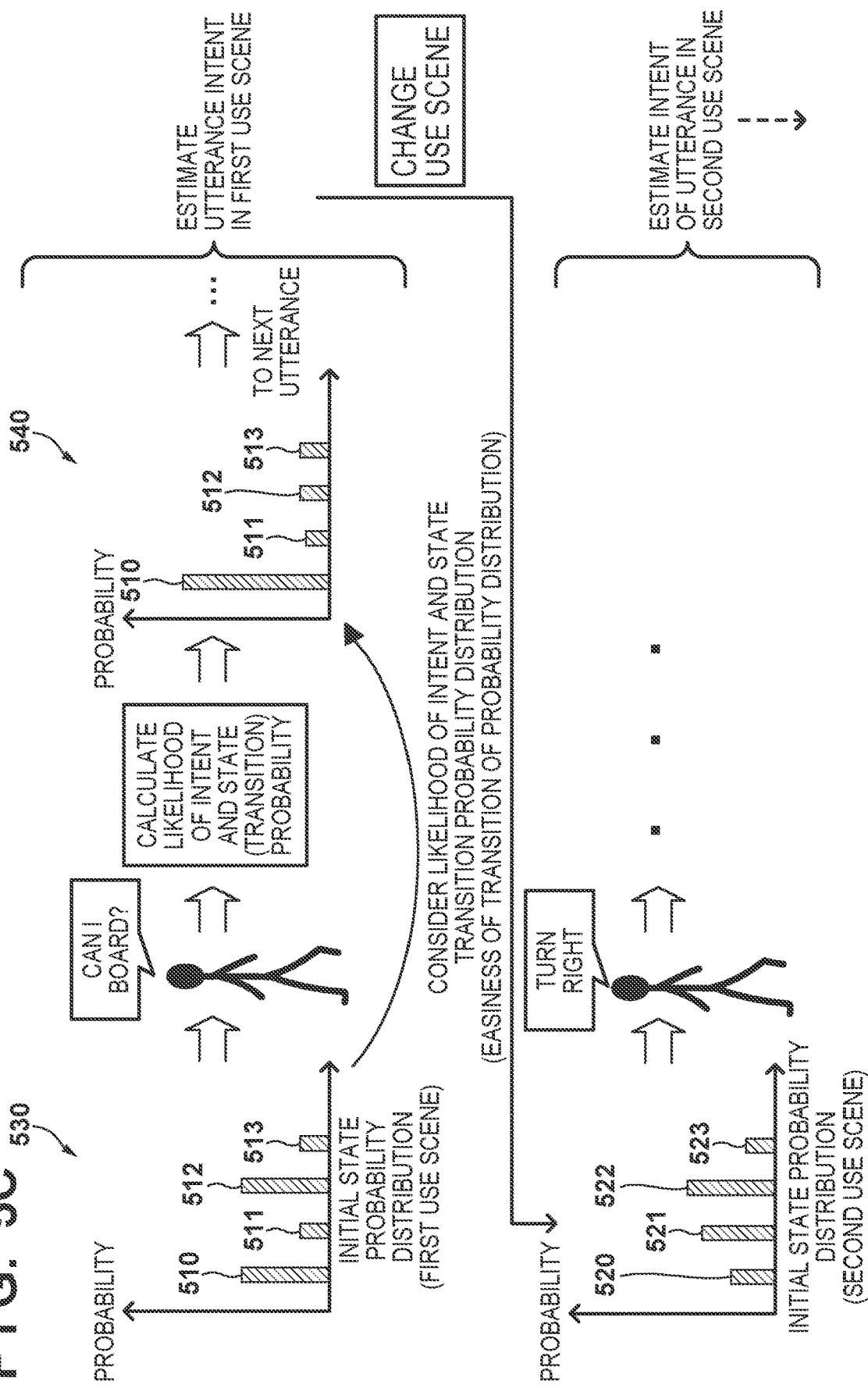

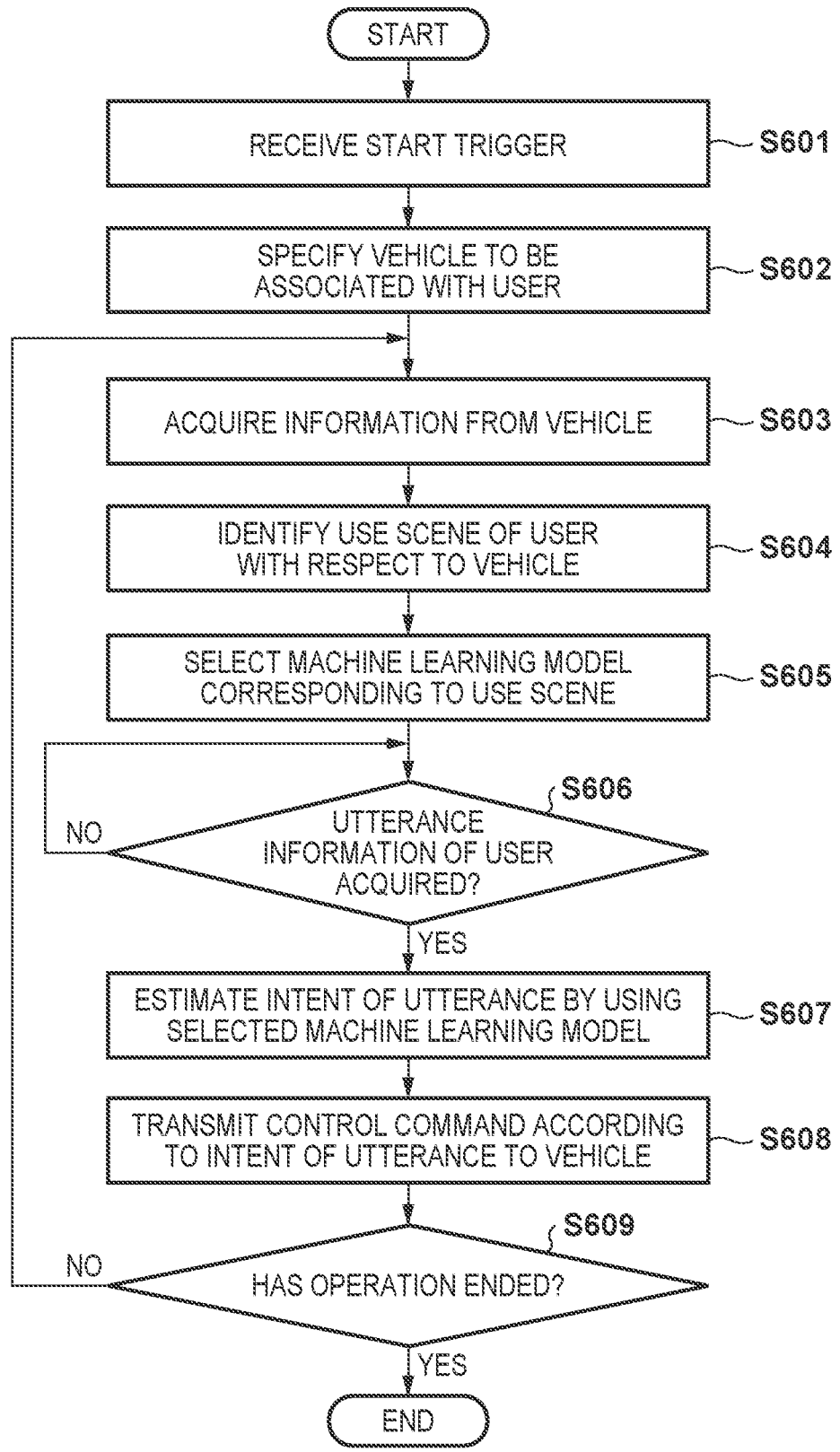

INFORMATION PROCESSING APPARATUS, INFORMATION PROCESSING METHOD, MOBILE OBJECT CONTROL DEVICE, AND MOBILE OBJECT CONTROL METHOD

CROSS-REFERENCE TO RELATED APPLICATION(S)

This application claims priority to and the benefit of Japanese Patent Application No. 2021-058446 filed on Mar. 30, 2021, the entire disclosure of which is incorporated herein by reference.

BACKGROUND OF THE INVENTION

Field of the Invention

The present invention relates to an information processing apparatus, an information processing method, a mobile object control device, and a mobile object control method.

Description of the Related Art

In recent years, development of man-machine interfaces using natural languages is in progress. In Qian Chen et al (BERT for Joint Intent Classification and Slot Filling, Feb. 28, 2019, https://arxiv.org/pdf/1902.10909.pdf), technology for realizing intent classification in an uttered sentence and slot filling using a language expression model called BERT is proposed. The intent classification in the uttered sentence is, for example, technology for estimating the user's intent in an instruction or inquiry (also referred to as query) of a user, and the slot filling is technology for recognizing information already provided by the user or insufficient information and asking a question for clarification or supplementing the information.

In Qian Chen et al, technology for simultaneously performing the intent classification and the slot filling using a single model implemented by BERT is proposed, and learning using an enormous amount of data is required to classify an utterance into any of a large number of intent classes.

Meanwhile, in order for a model of a single classifier to classify the user's intent, it is necessary to solve a classification problem for a large number of intent classes assuming every scene. In a case where it is assumed that the user controls a mobile object by utterance, for example, there may be many intents of the user, such as an inquiry about availability for calling the mobile object traveling nearby, an instruction of a route to the mobile object, an instruction related to traveling of a vehicle (for example, an instruction of acceleration), and a returning instruction to the mobile object that has finished boarding. That is, in order to classify various utterance intents from the inquiry about availability to the returning instruction in the control of the mobile object by utterance, a large model is required, and as a result, an enormous amount of learning data may be required or an intent classification result with desired accuracy may not be obtained.

SUMMARY OF THE INVENTION

The present disclosure has been made in consideration of the aforementioned issues, and realizes technology capable of providing utterance intent classification by a model constructed by smaller-scale learning in control of a mobile object by utterance.

In order to solve the aforementioned issues, one aspect of the present disclosure provides an information processing apparatus capable of controlling a mobile object on the basis of an instruction by an utterance of a user, the information processing apparatus comprising: one or more processors; and a memory storing instructions which, when the instructions are executed by the one or more processors, cause the information processing apparatus to function as: an identification unit configured to identify which scene a use scene of a target user is among a plurality of use scenes in a case where the mobile object is used; an acquisition unit configured to acquire utterance information of the target user; a selection unit configured to select a different machine learning model according to the identified use scene of the target user; and an estimation unit configured to estimate an intent of an utterance of the target user by using the selected machine learning model.

Another aspect of the present disclosure provides an information processing method in an information processing apparatus capable of controlling a mobile object on the basis of an instruction by an utterance of a user, the information processing method comprising: identifying which scene a use scene of a target user is among a plurality of use scenes in a case where the mobile object is used; acquiring utterance information of the target user; selecting a different machine learning model according to the identified use scene of the target user; and estimating an intent of an utterance of the target user by using the selected machine learning model.

Still another aspect of the present disclosure provides a control device of a mobile object that is controllable on the basis of an instruction by an utterance of a user, the control device comprising: an identification unit configured to identify which scene a use scene of a target user is among a plurality of use scenes in a case where the mobile object is used; an acquisition unit configured to acquire utterance information of the target user; a selection unit configured to select a different machine learning model according to the identified use scene of the target user; and an estimation unit configured to estimate an intent of an utterance of the target user by using the selected machine learning model.

Yet another aspect of the present disclosure provides a method for controlling a mobile object that is controllable on the basis of an instruction by an utterance of a user, the method comprising: identifying which scene a use scene of a target user is among a plurality of use scenes in a case where the mobile object is used; acquiring utterance information of the target user; selecting a different machine learning model according to the identified use scene of the target user; and estimating an intent of an utterance of the target user by using the selected machine learning model.

According to the present invention, it is possible to provide utterance intent classification by a model constructed by smaller-scale learning in control of a mobile object by utterance.

BRIEF DESCRIPTION OF THE DRAWINGS

FIG. 5A is a diagram illustrating a use scene when the vehicle is used, an utterance intent class associated with the use scene, and an utterance example corresponding to the intent class in the present embodiment;

FIG. 5C is a diagram illustrating a state in which an utterance intent is estimated in each of successive use scenes in the present embodiment;

FIG. 6 is a flowchart illustrating a series of operations of utterance intent estimation processing according to the present embodiment.

DESCRIPTION OF THE EMBODIMENTS

Figure 1:
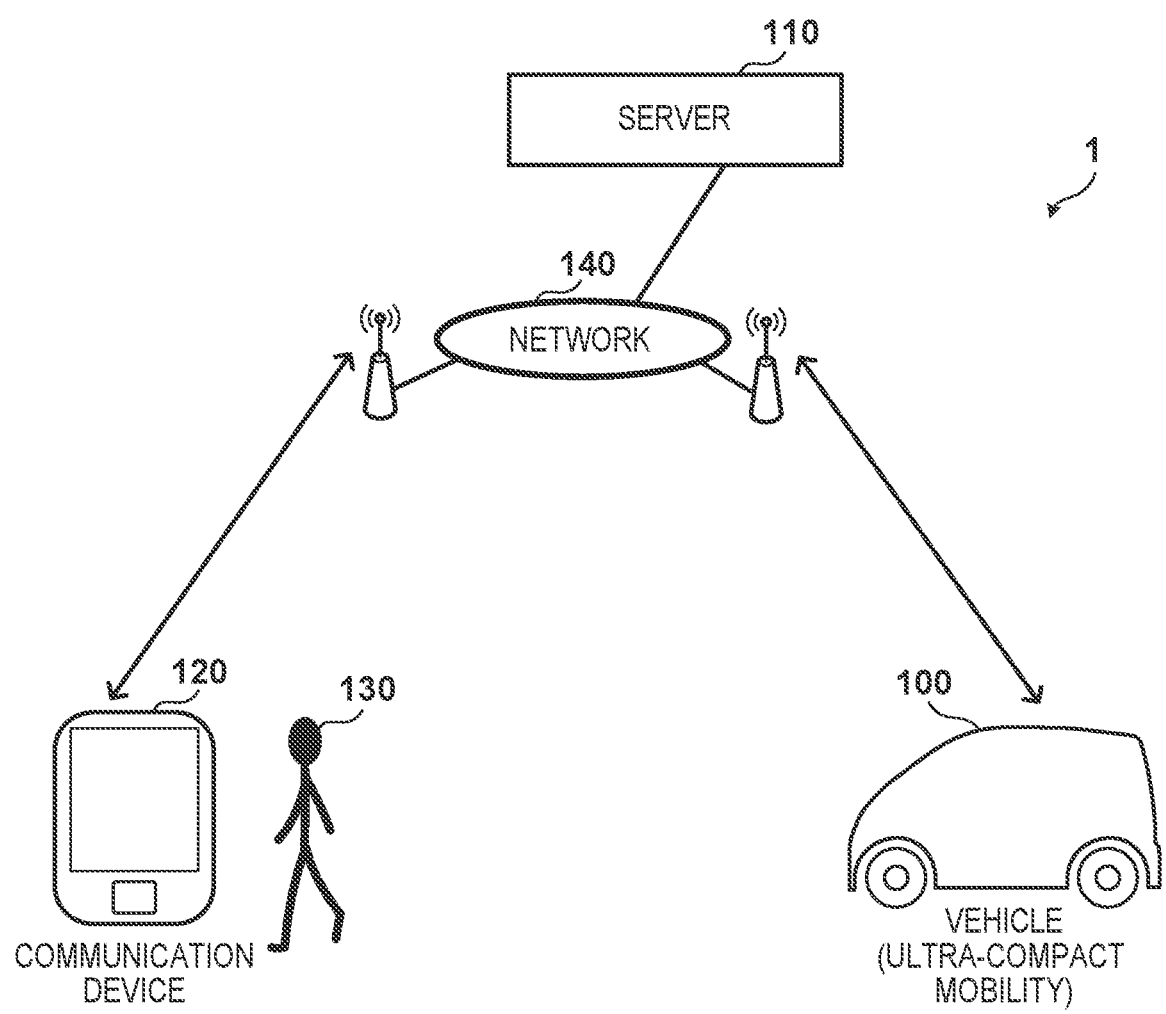
FIG. 1 is a diagram illustrating an example of an information processing system according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of Information Processing System

A configuration of an information processing system 1 according to the present embodiment will be described with reference to FIG. 1. The information processing system 1 includes a vehicle 100 as an example of a mobile object, a server 110 as an example of an information processing apparatus, and a communication device 120.

In the information processing system 1, a user 130 can interact with the vehicle 100 and control the operation of the vehicle 100 by utterance in a natural language. When the communication device 120 receives utterance from the user 130 to the vehicle 100, the communication device 120 transmits utterance information to the server 110. The server 110 estimates an utterance intent of the user from the utterance information of the user. The server 110 performs slot filling (recognizes information already provided by the user or insufficient information, and provides, to the user 130, a question for clarification as necessary) as necessary on the basis of the estimated utterance intent. When the server 110 recognizes the utterance intent of the user, the server 110 specifies necessary information from the utterance information to specify specific instruction contents, and receives the user's instruction. When the utterance of the user 130 is an instruction to the vehicle 100 (for example, "immediately come to pick me up at a current location"), the server 110 transmits a control instruction according to the instruction to the vehicle 100.

The vehicle 100 is an example of the mobile object, and is, for example, an ultra-compact mobility vehicle that is equipped with a battery and is mainly driven by a motor. The ultra-compact mobility vehicle is an ultra-compact vehicle that is more compact than a general automobile and has a riding capacity of about one person or two persons. In the present embodiment, the vehicle 100 is, for example, a four-wheeled vehicle. Note that, in the following embodiments, the mobile object is not limited to the vehicle, and may include a small mobility such as traveling in parallel with a walking user to carry baggage or lead a person, or may include another mobile object (for example, a walking robot or the like) capable of autonomous movement.

The vehicle 100 is connected to a network 140 via wireless communication such as Wi-Fi or 5th generation mobile communication. The vehicle 100 can measure states inside and outside the vehicle (a vehicle position, a vehicle traveling state, a target of an object around the vehicle, and the like) by various sensors and transmit measured data to the server 110. The data collected and transmitted as described above is also generally referred to as floating data, probe data, traffic information, or the like. The information on the vehicle is transmitted to the server 110 at regular intervals or in response to an occurrence of a specific event. The vehicle 100 can travel by automated driving even when the user 130 is not in the vehicle. The vehicle 100 receives information such as a control command provided from the server 110 or controls the operation of the vehicle using data measured by the self-vehicle.

The server 110 is an example of the information processing apparatus. The server 110 includes one or more server devices, and is capable of acquiring, via the network 140, information on the vehicle transmitted from the vehicle 100, utterance information transmitted from the communication device 120, and respective pieces of position information, and controlling traveling of the vehicle 100. The server 110 executes user intent estimation processing described below from the utterance information of the user and estimates the user's intent in the utterance.

The communication device 120 is, for example, a smartphone, but is not limited thereto, and may be an earphone-type communication terminal, a personal computer, a tablet terminal, a game machine, or the like. The communication device 120 is connected to the network 140 via wireless communication such as Wi-Fi or 5th generation mobile communication. The communication device 120 receives the utterance of the user 130 and transmits the received utterance information (voice information) to the server 110.

The network 140 includes, for example, a communication network such as the Internet or a mobile telephone network, and transmits information between the server 110 and the vehicle 100 and information between the server 110 and the communication device 120.

Configuration of Vehicle

Next, a configuration of the vehicle 100 as an example of the vehicle according to the present embodiment will be described with reference to FIGS. 2A and 2B.

Figure 2A:
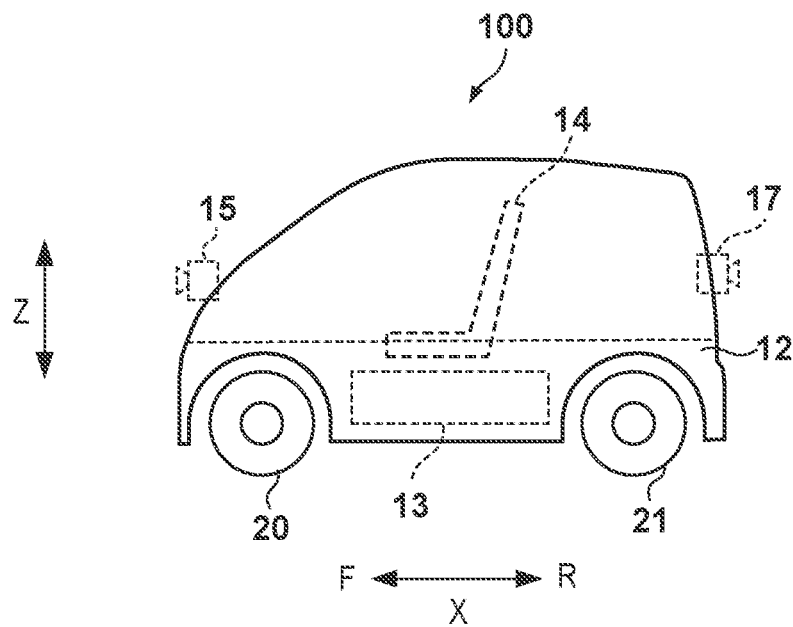
FIGS. 2A and 2B are block diagrams illustrating a hardware configuration example of a vehicle according to the present embodiment.
Figure 2B:
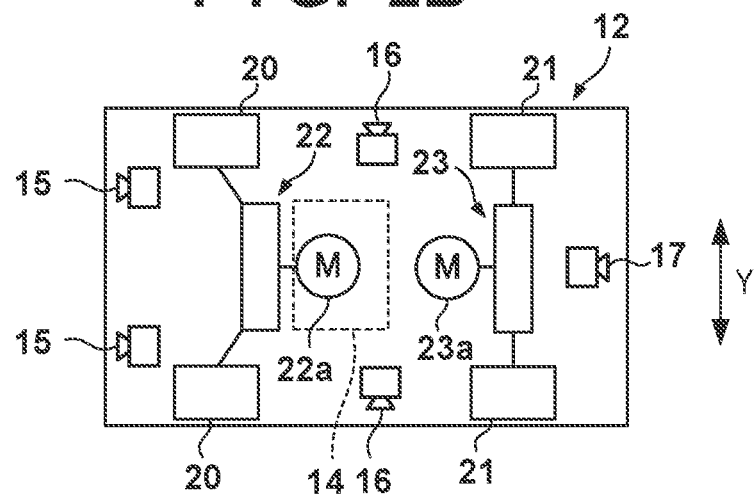

FIG. 2A illustrates a side surface of the vehicle 100 according to the present embodiment, and FIG. 2B illustrates an internal configuration of the vehicle 100. In FIGS. 2A and 2B, an arrow X indicates a front-and-rear direction of the vehicle 100, F indicates the front, and R indicates the rear. Arrows Y and Z indicate a width direction (lateral direction) and a vertical direction of the vehicle 100, respectively.

The vehicle 100 is an electric autonomous vehicle including a traveling unit 12 and using a battery 13 as a main power supply. The battery 13 is, for example, a secondary battery such as a lithium ion battery, and the vehicle 100 autonomously travels by the traveling unit 12 by electric power supplied from the battery 13. The traveling unit 12 is a four-wheeled vehicle including a pair of left and right front wheels 20 and a pair of left and right rear wheels 21. The traveling unit 12 may be in another form such as a form of a tricycle. The vehicle 100 includes a seat 14 for one person or two persons. The seat 14 transmits information on whether or not an occupant is in the vehicle to a control unit 30 by, for example, a pressure sensor or the like.

The traveling unit 12 includes a steering mechanism 22. The steering mechanism 22 is a mechanism that changes a steering angle of the pair of front wheels 20 using a motor 22a as a driving source. A traveling direction of the vehicle 100 can be changed by changing the steering angle of the pair of front wheels 20. The traveling unit 12 further includes a driving mechanism 23. The driving mechanism 23 is a mechanism that rotates the pair of rear wheels 21 using a motor 23a as a driving source. The vehicle 100 can be moved forward or backward by rotating the pair of rear wheels 21.

The vehicle 100 includes detection units 15 to 17 that detect targets around the vehicle 100. The detection units 15 to 17 are a group of external sensors that monitors the surroundings of the vehicle 100, and in the case of the present embodiment, each of the detection units 15 to 17 is an imaging device that captures an image of the surroundings of the vehicle 100 and includes, for example, an optical system such as a lens and an image sensor. However, instead of or in addition to the imaging device, a radar or a light detection and ranging (LiDAR) can be adopted.

The two detection units 15 are disposed on front portions of the vehicle 100 in a state of being separated from each other in a Y direction, and mainly detect targets in front of the vehicle 100. The detection units 16 are disposed on a left side portion and a right side portion of the vehicle 100, respectively, and mainly detect targets on sides of the vehicle 100. The detection unit 17 is disposed on a rear portion of the vehicle 100, and mainly detects targets behind the vehicle 100.

Figure 3:
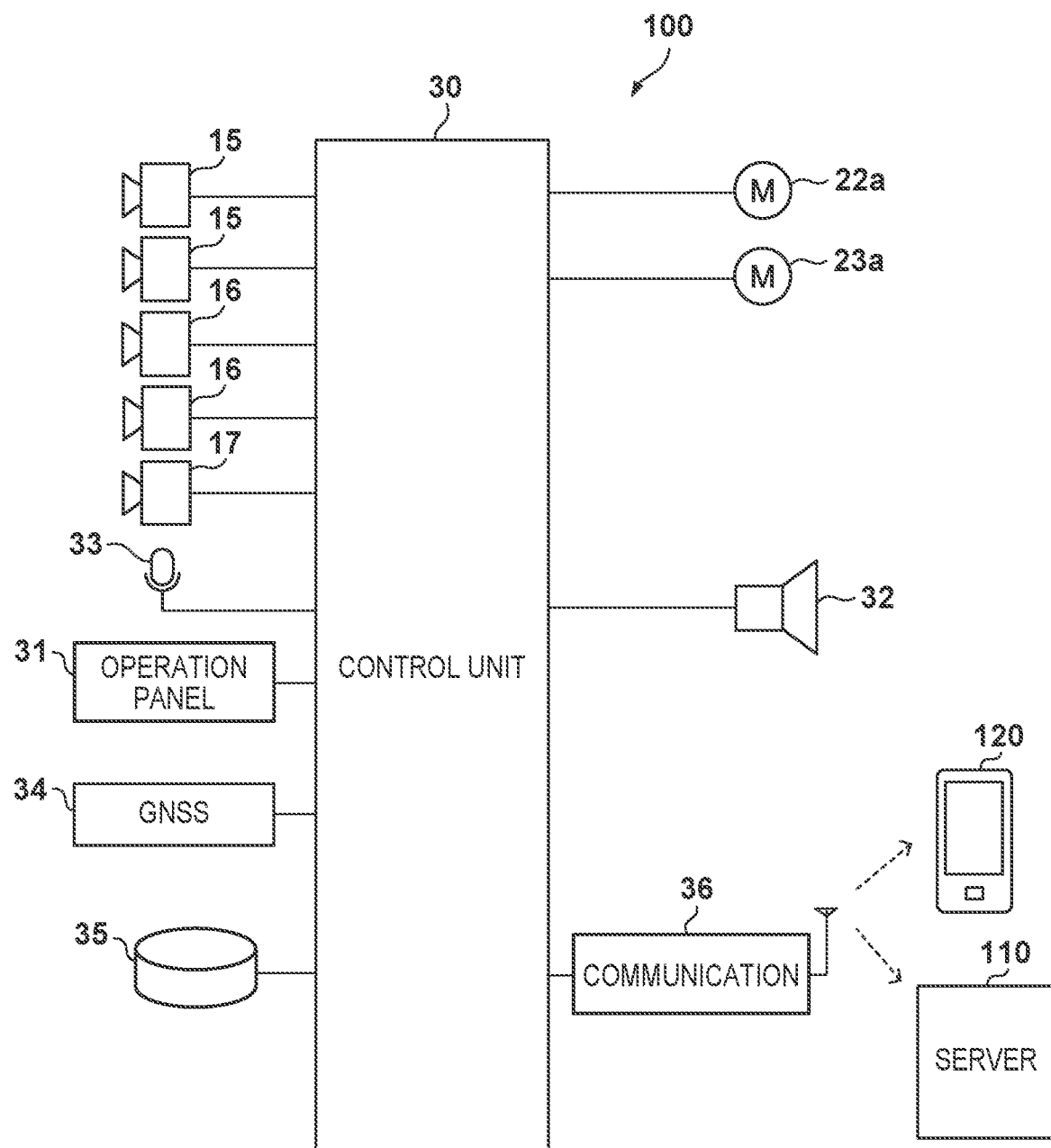
FIG. 3 is a block diagram illustrating a functional configuration example of the vehicle according to the present embodiment.

FIG. 3 is a block diagram of a control system of the vehicle 100. The vehicle 100 includes a control unit (ECU) 30. The control unit 30 includes a processor represented by a central processing unit (CPU), a storage device such as a semiconductor memory or the like, an interface with an external device, and the like. In the storage device, programs executed by the processor, data used for processing by the processor, and the like are stored. A plurality of sets of processors, storage devices, and interfaces may be provided for each function of the vehicle 100 so as to be able to communicate with each other. Voice recognition processing for the input voice or image recognition processing for the image captured by the detection units may be performed.

The control unit 30 executes corresponding processing according to detection results of the detection units 15 to 17, input information of an operation panel 31, voice information input from a voice input device 33, a control command from the server 110, and the like. The control unit 30 performs control of the motors 22a and 23a (traveling control of the traveling unit 12), display control of the operation panel 31, notification to an occupant of the vehicle 100 by voice, and output of information.

The voice input device 33 can collect a voice of the occupant of the vehicle 100. The control unit 30 can recognize the input voice and execute corresponding processing. A global navigation satellite system (GNSS) sensor 34 receives a GNSS signal and detects a current position of the vehicle 100.

A storage apparatus 35 is a mass storage device that stores map data and the like including information regarding a traveling road on which the vehicle 100 can travel, landmarks such as buildings, stores, and the like. Also in the storage apparatus 35, programs executed by the processor, data used for processing by the processor, and the like may be stored. The storage apparatus 35 may store various parameters (for example, learned parameters of a deep neural network and the like) of a machine learning model for voice recognition or image recognition executed by the control unit 30.

The communication device 36 is, for example, a communication device that can be connected to the network 140 via wireless communication such as Wi-Fi or 5th generation mobile communication.

Configuration of Server

Figure 4:
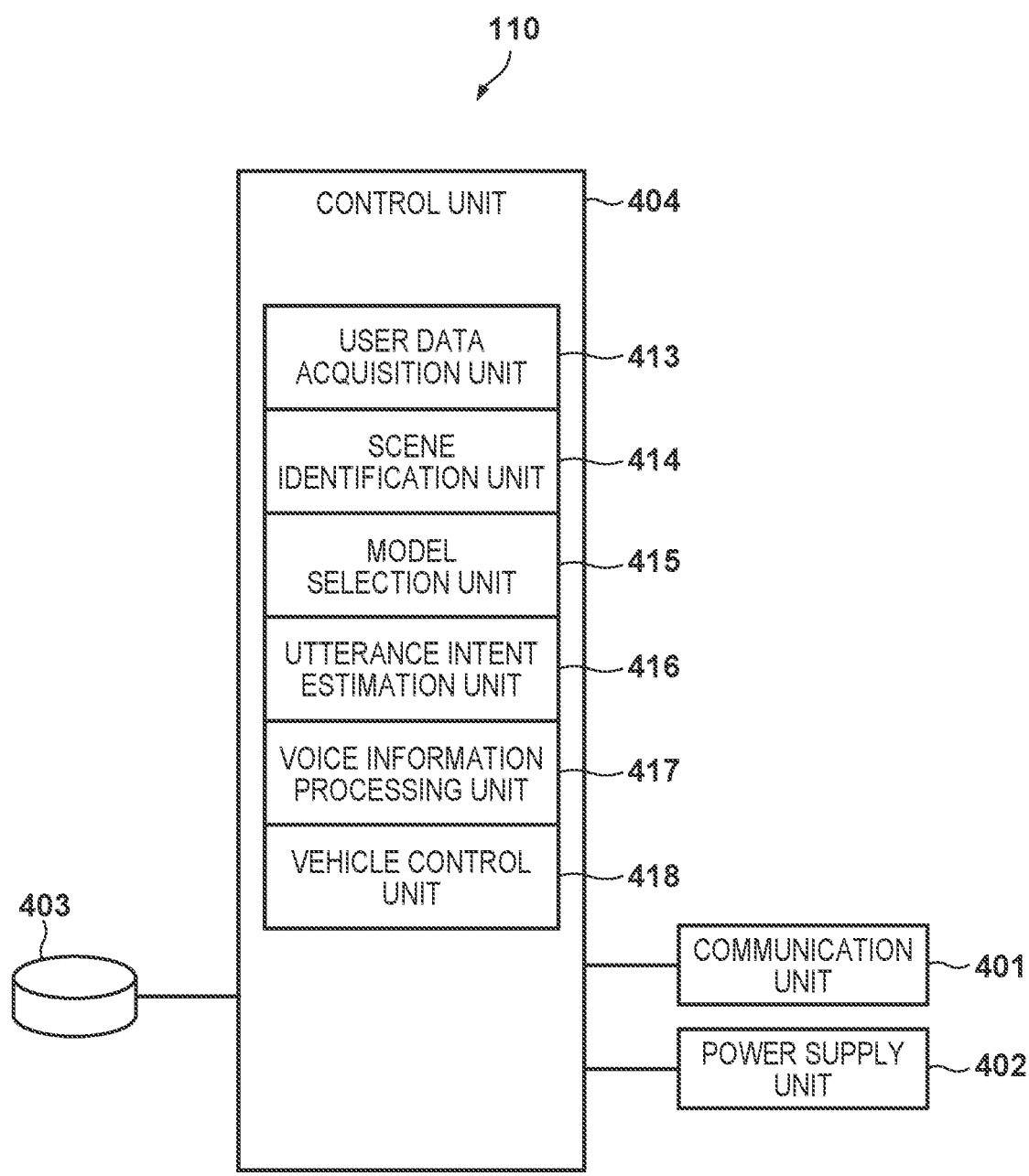
FIG. 4 is a block diagram illustrating a functional configuration example of a server according to the present embodiment.

Next, a configuration of the server 110 as an example of the information processing apparatus according to the present embodiment will be described with reference to FIG. 4.

The control unit 404 includes a processor represented by the CPU, a storage device such as a semiconductor memory or the like, an interface with an external device, and the like. In the storage device, programs executed by the processor, data used for processing by the processor, and the like are stored. The plurality of sets of processors, storage devices, and interfaces may be provided for each function of the server 110 so as to be able to communicate with each other. The control unit 404 executes various operations of the server 110, user intent estimation processing to be described later, control of the vehicle 100, and the like by executing the programs. In addition to the CPU, the control unit 404 may further include a graphical processing unit (GPU) or dedicated hardware suitable for executing processing of a machine learning model such as a neural network.

A user data acquisition unit 413 acquires the utterance information of the user 130 transmitted from the communication device 120. In addition, the user data acquisition unit 413 acquires floating data (for example, a position of the vehicle, presence or absence of an occupant, and the like) information transmitted from the vehicle 100. The user data acquisition unit 413 may store the acquired utterance information, position information, and the like in a storage unit 403. The information of the utterance acquired by the user data acquisition unit 413 is input to a learned model in an inference stage (learned), but may be used as learning data for learning the machine learning model executed by the server 110.

A scene identification unit 414 identifies a current scene in which the user is placed. For example, the scene identification unit 414 identifies whether the user's scene is before boarding, during boarding, or after alighting. An example of a scene identification method will be described later.

A model selection unit 415 selects a machine learning model in the scene identified by the scene identification unit 414. As described later, there are a plurality of machine learning models, and each machine learning is associated with, for example, any one of before boarding, during boarding, and after alighting. That is, each machine learning model is configured such that an intent class to be estimated is different for each associated use scene, and the likelihood of the intent class of any scene is output.

An utterance intent estimation unit 416 estimates an utterance intent of the user by using the machine learning model selected by the model selection unit 415. An utterance intent estimation method will be described later.

A voice information processing unit 417 specifies necessary information from the utterance information to specify specific instruction contents on the basis of the recognized utterance intent. For example, in a case where the intent of the utterance information of the user is to request to come for pick-up, information such as where and what time to go for pick-up is specified. When the voice information processing unit 417 specifies the necessary information, the voice information processing unit 417 accepts an instruction from the user. The voice information processing unit 417 may further include processing of slot filling. The voice information processing unit 417 may include a plurality of machine learning models different from the machine learning model for utterance intent estimation, and each machine learning model may be configured by, for example, a deep neural network (DNN). The DNN becomes a learned state by performing the processing of the learning stage, and can perform processing (processing of the inference stage) on new utterance information by inputting the new utterance information to the learned DNN.

A vehicle control unit 418 controls the operation of the vehicle 100 on the basis of utterance contents recognized by the voice information processing unit 417. For example, in a case where information such as where and what time to go for pick-up is specified from the utterance information of the user, a route is specified on the basis of current positions of the user and the vehicle, map information, and the like, and the vehicle is caused to travel on the route.

Note that the server 110 can generally use more abundant calculation resources than the vehicle 100 or the like. It is possible to provide a calculation result faster than a case where each vehicle 100 is equipped with calculation resources for executing a machine learning model, and it is also possible to contribute to cost reduction of the vehicle. Further, the server 110 receives and accumulates utterance information of various users, so that learning data including a wide variety of utterance information can be collected, and more robust inference processing is enabled.

A communication unit 401 is a communication device including, for example, a communication circuit and the like, and communicates with an external device such as the vehicle 100 or the communication device 120. The communication unit 401 receives position information and information on the presence or absence of an occupant from the vehicle 100, and utterance information and position information from the communication device 120, and transmits a control command to the vehicle 100 and utterance information to the communication device 120.

A power supply unit 402 supplies electric power to each unit in the server 110. The storage unit 403 is a nonvolatile memory such as a hard disk or a semiconductor memory.

Outline of User Intent Estimation Processing

As described above, in a case where it is assumed that the user controls the mobile object by utterance, for example, there may be many intents of the user, such as an inquiry about availability for calling the mobile object traveling nearby, an instruction of a route to the mobile object, an instruction related to traveling of the vehicle (for example, an instruction of acceleration), and a returning instruction to the mobile object that has finished boarding.

However, before the use of the mobile object, there is a possibility that an inquiry about availability of the mobile object or an utterance with an intent to call the mobile object is made, but there is a low possibility that an utterance with an intent to instruct returning after the use is made. In other words, the intent of the conversation issued in each scene of before boarding, during boarding, and after alighting may not appear in other scenes.

Therefore, in the present embodiment, an intent class is collected for each scene (use scene) assumed when the mobile object is controlled by utterance, and a machine learning model is associated for each scene. Each machine learning model estimates only the intent class of the associated use scene. In this way, a model suitable for each scene can be used, and each model can be smaller in size than when a large number of intent classes are classified by a single model, and can be constructed by the smaller-scale learning. In addition, improvement in recognition accuracy can be expected.

Hereinafter, a relation between a use scene and an utterance intent class and an intent estimation algorithm according to the present embodiment will be described with reference to FIGS. 5A to 5C.

FIG. 5A illustrates a use scene when the vehicle is used, an utterance intent class associated with the use scene, and an utterance example corresponding to the intent class. As illustrated in FIG. 5A, a use scene 501 is divided into a state before boarding the vehicle 100 (pre-boarding state), a state during boarding (in-boarding state), and a state after alighting (post-alighting state), as an example. Note that "always" in FIG. 5A means that not a specific use scene but three intent classes belonging to "always" are included in any use scene.

An utterance intent class 502 represents an intent in the user's utterance. For example, seven intent classes such as an inquiry, a pick-up request, a greeting, a destination instruction, agreement, denial, and asking again are associated with the use scene of "before boarding". Further, for example, seven intent classes such as a route instruction, a stop instruction, an acceleration instruction, a deceleration instruction, agreement, denial, and asking again are associated with the use scene of "during boarding". Similarly, seven intent classes illustrated in FIG. 5A are associated with the use scene of "after alighting".

An utterance example 503 illustrates an utterance example corresponding to each intent class. For example, the intent of "inquiry" corresponds to an utterance such as "Can I board the vehicle now?".

As described above, a continuous scene assumed when the vehicle is used is defined as a predetermined number of scenes, and only some intent classes among all intent classes that can be associated with a plurality of use scenes are associated with each use scene. In this way, the machine learning model may output the inference result only for some intent classes among all intent classes that can be associated with the plurality of use scenes. Therefore, it is possible to miniaturize the machine learning model for estimating the intent class and cause the machine learning model to perform learning with the small learning data.

Note that, in the example illustrated in FIG. 5A, the same number of intent classes are associated with all the use scenes, but a different number of intent classes may be associated with each use scene. In addition, the intent classes are not limited to the above example, and may include other intent classes, or may not include some intent classes illustrated in FIG. 5A. For example, the use scene before boarding may further include a "catch-up request" that requests the vehicle to catch up with the destination of the user. For the catch-up request, for example, an utterance example such as "catch up" can be considered.

For the utterance example, an utterance example in which the user 130 speaks to the vehicle 100 has been illustrated as an example. However, the utterance example is not limited to the utterance example in which the user 130 speaks to the vehicle 100, and an utterance that the user 130 speaks to a human concierge (mediating control of the vehicle) may be used.

Next, an example of a case where a hidden Markov model is applied to the use scene before boarding will be described with reference to FIG. 5B. The Markov model refers to a probability model according to a probability process in which a probability distribution of a state at any time depends only on an immediately preceding state. In the present embodiment, the hidden Markov model (also referred to as an HMM) is applied to solve a problem of estimating a hidden state (utterance intent) behind an observable state (utterance information) when the observable state is given.

Figure 5B:
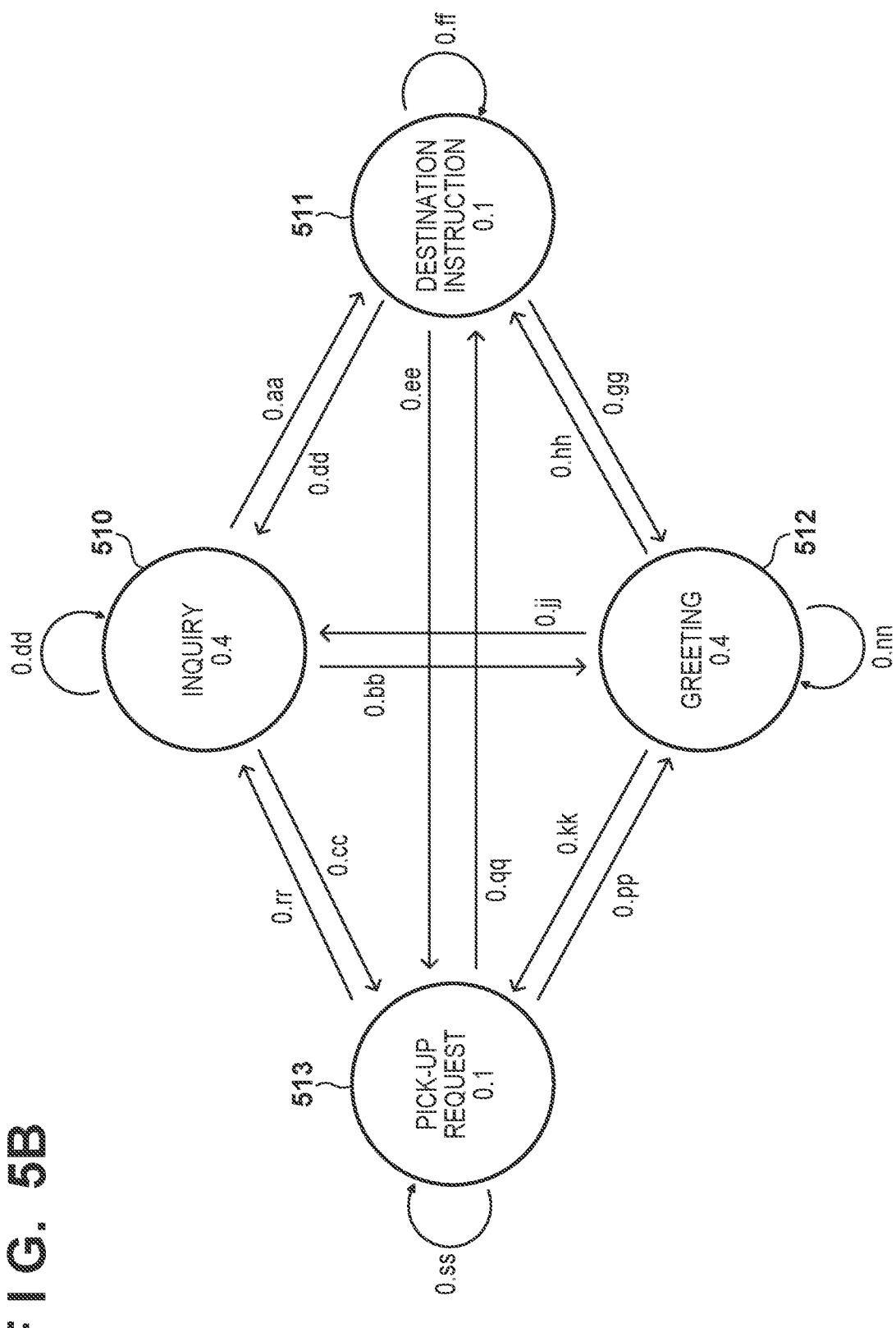
FIG. 5B is a diagram illustrating an example of a case where a hidden Markov model is applied to a use scene before boarding in the present embodiment.

Each of reference numerals 510 to 513 illustrated in FIG. 5B represents a hidden state in the hidden Markov model and corresponds to an intent class. Note that, in the example illustrated in FIG. 5B, only four intent classes are illustrated as an example so as not to complicate the drawing. A numerical value described in a circle of the intent class indicates the initial state probability. That is, the numerical value indicates the probability (likelihood) of the intent class that can occur immediately after the use scene of "before boarding". In addition, each arrow indicates a transition between intent classes (states), and a numerical value (for example, "0.aa") attached to the arrow indicates a state transition probability. A distribution of the initial state probability and a distribution of the state transition probability may be determined in advance. For example, the transition probability between intent classes of correct answer data included in learning data and the initial state probability can be obtained and used.

Furthermore, an example of intent estimation processing according to the present embodiment will be described with reference to FIG. 5C. In the example illustrated in FIG. 5C, an utterance intent is estimated for each use scene with "before boarding" as a first use scene and "during boarding" as a second use scene. Reference numerals 510 to 513 in FIG. 5C correspond to the intent classes illustrated in FIG. 5B, and a bar graph in the probability distribution indicates the probability (likelihood) of each intent class. Reference numerals 520 to 523 in FIG. 5C correspond to intent classes (route instruction, stop instruction, acceleration instruction, and deceleration instruction) of "during boarding", and a bar graph in the probability distribution represents the probability (likelihood) of these intent classes.

In an initial state probability distribution 530 of the first use scene, as illustrated in FIG. 5B, probabilities of the inquiry and the greeting are higher than the other probabilities. After the start of the first use scene, the user utters (for example, "Can I board a vehicle?"). Then, the server 110 calculates the probability (likelihood) of the intent class using the machine learning model associated with the first use scene, and calculates the probability (likelihood) of the intent class in consideration of the initial state probability distribution 530 (probability distribution 540). The probability distribution 540 of the first use scene indicates that the probability (likelihood) of the inquiry intent is high. Furthermore, when the user makes a next utterance, the server 110 calculates the probability (likelihood) of the intent class using the same machine learning model, and calculates the probability (likelihood) of the intent class in consideration of the state transition probability. As described above, in addition to the calculation of the likelihood of the intent by the machine learning model, the probability of transition from a state of a certain intent to a state of a next intent is taken into consideration, so that final utterance intent estimation can be performed in consideration of the likelihood of the intent and easiness of transition of the probability distribution.

Thereafter, when the use scene changes, the server 110 calculates the probability (likelihood) of the intent class using the machine learning model associated with the second use scene, the initial state probability distribution of the second use scene, and the state transition probability distribution of the second use scene.

In the present embodiment, the server 110 calculates the likelihood of the intent class according to the following formula. The following intent class calculation is performed for each use scene as described above.

$$b(c_t) \propto P(x_t|c_t) \sum_{c_{t-1} \ni C} P(c_t|c_{t-1})b(c_{t-1}) \qquad [\text{Math. 1}]$$

an intent class $C^*_t \, argmax_{c_t \ni C} \, b(c_t)$

In the above formula, $b(c_t)$ represents a discrete probability distribution of an intent class, $x_t$ represents a vectorized uttered sentence, C represents a set of possible intent classes (vectorized), c represents a random variable representing an intent class, and a subscript t ($t \geq 1$) represents time. A calculation result of $P(x_t|c_t)$ of a likelihood function is obtained by calculation of the machine learning model (different for each use scene). $b(c_{t=0})$ represents an initial state probability distribution (different for each use scene). $P(c_t|c_{t-1})$ represents a state transition probability (different for each use scene). With this calculation, when the intent of the utterance at the time t is estimated, an estimation result estimated for an utterance immediately before the utterance at the time t can be recursively considered.

Series of Operations of User Intent Estimation Processing

Next, a series of operations of user intent estimation processing in the server 110 will be described with reference to FIG. 6. Note that the present processing is realized when the control unit 404 executes a program. The machine learning model executed in the present series of operations is in a state of being learned (inference stage) using the learning data. In the following description, it is assumed that the control unit 404 executes each process for the sake of simplicity of description, but corresponding processing is executed by each unit of the control unit 404 (described above with reference to FIG. 4).

In S601, the control unit 404 receives a start trigger from the communication device 120. The start trigger indicates, for example, the start of use of a service for controlling the vehicle on the basis of the utterance of the user. The start trigger is transmitted from the communication device 120 in response to, for example, that the user 130 has started an application for using the service or has uttered a predetermined term indicating the start of use of the service in the communication device 120.

In S602, the control unit 404 specifies the vehicle to be associated with the user 130. For example, the control unit 404 specifies the vehicle 100 closest to the user 130 on the basis of current positions of various vehicles that are always grasped from floating data transmitted from the vehicle and a current position of the user 130. The present invention is not limited to this method, and a vehicle designated by the user on the communication device 120 may be specified as a vehicle to be associated.

In S603, the control unit 404 acquires information for determining the use scene from the specified vehicle 100. The information for determining the use scene includes, for example, information on whether or not an occupant is in the vehicle, and information on whether or not the user 130 has boarded the vehicle within a predetermined time. The information on whether or not the occupant is in the vehicle is obtained from, for example, a seat of the vehicle. Information of an occupant recognized by an imaging device installed in the vehicle may be further included.

When these pieces of information are included in the floating data transmitted from the vehicle 100 to the server 110, the present step may be omitted. In this case, the control unit 404 may acquire information of the specified vehicle 100 from the floating data. Although not explicitly illustrated in FIG. 6, when another user is in the vehicle 100, the control unit 404 returns the processing to S602 and specifies another vehicle.

In S604, the control unit 404 identifies the use scene of the user with respect to the vehicle 100. The use scene is identified from {before boarding, during boarding, and after alighting} described above. In a case where the occupant is not in the vehicle and the user 130 does not board the vehicle within the predetermined time, the control unit 404 identifies the current use scene as before boarding. In a case where the occupant is in the vehicle and the occupant is the user 130, it is determined that the current use scene is during boarding. In addition, in a case where the occupant is not in the vehicle and the user 130 has boarded the vehicle within the predetermined time, the control unit 404 identifies the current use scene as after alighting.

In S605, the control unit 404 selects a machine learning model corresponding to the identified use scene. Each of the machine learning models is learned using learning data different for each corresponding use scene. In the learning data, for example, a label of an intent of an utterance to be a correct answer is given to the utterance information of the user, and a label indicating a corresponding use scene is further given. That is, at the time of learning the machine learning model for each use scene, the control unit 404 can input only the learning data of the corresponding use scene to the machine learning model and cause the machine learning model to perform learning.

In S606, the control unit 404 determines whether the utterance information of the user has been acquired. If the control unit 404 has acquired the utterance information of the user from the communication device 120, the control unit 404 proceeds the processing to S607, and if not, the control unit 404 returns the processing to S606 and waits for acquisition of the utterance information of the user.

In S607, the control unit 404 estimates an utterance intent using the machine learning model selected in S605. Specifically, the control unit 404 calculates an output intent class argmax $b(c_t)$ by performing calculation according to the mathematical formula described above. At this time, if the utterance information of the user is utterance information immediately after a new use scene is identified, calculation in the case of t=1 is executed, and if not, calculation in the case of t≥2 is executed.

In S608, the control unit 404 transmits a control command according to the utterance intent to the vehicle. For example, as described above, the control unit 40 specifies necessary information from the utterance information to specify specific instruction contents on the basis of the estimated utterance intent. For example, in a case where the intent of the utterance information of the user is to request to come for pick-up, information such as where and what time to go for pick-up is specified. The voice information processing unit 417 may further include processing of slot filling. Furthermore, the control unit 404 transmits a control command for controlling the operation of the vehicle 100 to the vehicle 100 on the basis of the recognized utterance contents. For example, in a case where information such as where and what time to go for pick-up is specified from the utterance information of the user, a route is specified on the basis of the current positions of the user and the vehicle, map information, and the like, and a control command for causing the vehicle to travel on the route is transmitted to the vehicle 100.

In S609, the control unit 404 determines whether the user operation has ended. The control unit 404 determines, for example, whether information indicating the end has been received from the communication device 120. The information indicating the end is transmitted from the communication device 120, for example, in response to that the user 130 has uttered a predetermined term indicating the end of use of the service in the communication device 120. If it is determined that the user operation has ended, the control unit 404 ends the present series of processing, and if not, the control unit 404 returns the processing to S603 and repeats the processing of S603 and subsequent steps.

Note that, in the above-described embodiment, the case where the server 110 identifies the use scene on the basis of the information from the vehicle 100 has been described as an example. However, the server 110 may identify the use scene on the basis of other information. For example, the server 110 may identify the use scene on the basis of the information from the communication device 120. For example, the communication device 120 may receive a start trigger transmitted from the communication device 120 and information indicating occurrence of proximity to the vehicle, and identify the use scene. As described above, the start trigger is transmitted from the communication device 120 in response to, for example, that the user 130 has started an application for using the service or has uttered a predetermined term indicating the start of use of the service in the communication device 120. Furthermore, for example, in a case where the communication device 120 is caused to come close to the vehicle 100 when the user boards the vehicle 100 and when the user alights from the vehicle 100, and the communication device 120 detects the proximity to the vehicle by proximity wireless communication or the like, information indicating the occurrence of the proximity is transmitted to the vehicle. For example, in a case where the information indicating the occurrence of the proximity is not received after the reception of the start trigger, the server 110 may identify the use scene as before boarding, and in a case where the information indicating the occurrence of the proximity is received thereafter, the server 110 may identify the use scene as during boarding. Further, when the information indicating the occurrence of the proximity is received, the use scene may be identified as after alighting. Note that, instead of the server 110 identifying the use scene, the use scene may be identified in the communication device 120, and the identified use scene may be transmitted to the server 110 according to switching of the use scene.

As described above, in the above embodiment, in the information processing apparatus capable of controlling the vehicle on the basis of the instruction by the utterance of the user, first, which scene the use scene of the target user is among the plurality of use scenes when the vehicle is used is identified. After the use scene is identified, a different machine learning model is selected according to the identified use scene of the target user, and the utterance intent of the target user is estimated using the selected machine learning model. In this way, in the control of the mobile object by the utterance, the classification of the utterance intent can be provided by the model constructed by the smaller-scale learning.

Modifications

Figure 7:
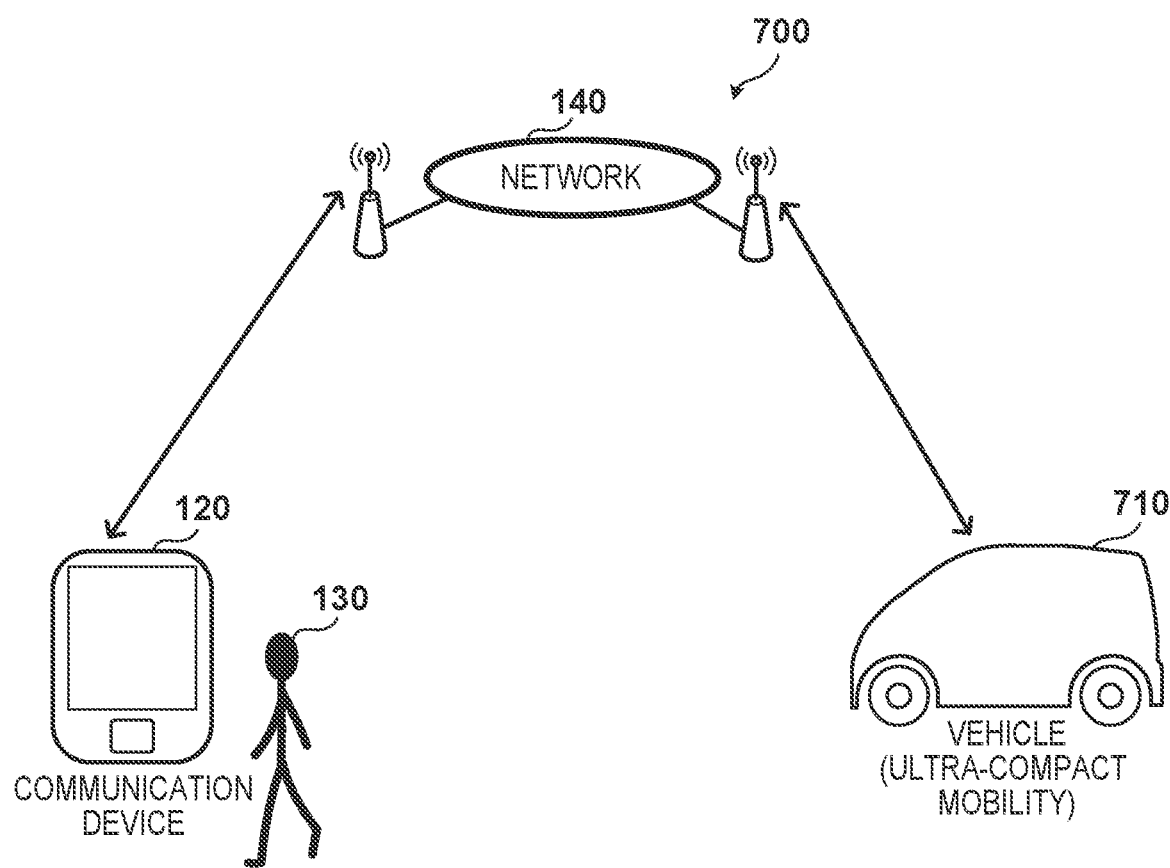
FIG. 7 is a diagram illustrating an example of an information processing system according to another embodiment.

Hereinafter, modifications according to the present invention will be described. In the above embodiment, an example in which the utterance intent estimation processing is executed in the server 110 has been described. However, the utterance intent estimation processing can also be executed on the vehicle side. In this case, as illustrated in FIG. 7, an information processing system 700 includes a vehicle 710 and a communication device 120. The utterance information of the user is transmitted from the communication device 120 to the vehicle 710. The configuration of the vehicle 710 may be the same as that of the vehicle 100, except that the control unit 30 can execute the utterance intent estimation processing. The control unit 30 of the vehicle 710 operates as a control device in the vehicle 710, and executes the utterance intent estimation processing by executing a stored program. Communication between the server and the vehicle in the series of operations illustrated in FIG. 6 may be performed inside the vehicle (for example, inside the control unit 30). The other processing can be executed similarly to the server.

As described above, in the control device capable of controlling the vehicle on the basis of the instruction by the utterance of the user, first, which scene the use scene of the target user is among the plurality of use scenes when the vehicle is used is identified. After the use scene is identified, a different machine learning model is selected according to the identified use scene of the target user, and the utterance intent of the target user is estimated using the selected machine learning model. In this way, in the control of the mobile object by the utterance, the classification of the utterance intent can be provided by the model constructed by the smaller-scale learning.

SUMMARY OF EMBODIMENTS

1. An information processing apparatus (e.g., 110) in the above embodiment is an information processing apparatus capable of controlling a mobile object (e.g., 100) on the basis of an instruction by an utterance of a user, the information processing apparatus comprising:
   an identification unit (e.g., 414) configured to identify which scene a use scene of a target user is among a plurality of use scenes in a case where the mobile object is used;
   an acquisition unit (e.g., 413) configured to acquire utterance information of the target user;
   a selection unit (e.g., 415) configured to select a different machine learning model according to the identified use scene of the target user; and
   an estimation unit (e.g., 416) configured to estimate an intent of an utterance of the target user by using the selected machine learning model.

According to this embodiment, in the control of the mobile object by the utterance, the classification of the utterance intent can be provided by the model constructed by the smaller-scale learning.

2. In the information processing apparatus according to the above embodiment, the machine learning model has a different intent class to be estimated for each use scene which the machine learning model is associated with.

According to this embodiment, it is possible to use a machine learning model suitable for each scene.

3. In the information processing apparatus according the above embodiment, the estimation unit estimates the intent of the target user by using the machine learning model that outputs the likelihood only for some intent classes among all intent classes associated with the plurality of use scenes.

According to this embodiment, it is possible to use a model that outputs a small number of intent classes suitable for each scene. That is, it is possible to facilitate learning of the model.

4. In the information processing apparatus according to the above embodiment, the estimation unit estimates the intent of the utterance of the target user in consideration of calculation using an initial state probability distribution set to an intent class as a prior distribution to output of the selected machine learning model.

According to this embodiment, it is possible to reflect common knowledge (a possibility that a first utterance of communication has a negative intent or there is an intent of greeting in the middle of conversation is low) about an utterance that depends on the context of a scene.

5. In the information processing apparatus according to the above embodiment, the initial state probability distribution set as the prior distribution is separately determined for each use scene.

According to this embodiment, it is possible to reflect common knowledge about the utterance for each scene.

6. In the information processing apparatus according to the above embodiment, the estimation unit estimates the intent of the utterance of the target user in consideration of calculation using a state transition probability distribution between intent classes to output of the selected machine learning model.

According to this embodiment, it is possible to perform intent estimation in consideration of the transition order of the intent in the actual conversation.

7. In the information processing apparatus according to the above embodiment, the state transition probability distribution is separately determined for each scene.

According to this embodiment, it is possible to separately determine state transition probabilities between intent classes of scenes.

8. In the information processing apparatus according the above embodiment, in a case where the estimation unit estimates an intent of an utterance at time t, the estimation unit estimates the intent of the utterance of the target user in consideration of an estimation result estimated for an utterance immediately before the utterance at the time t to output of the selected machine learning model.

According to this embodiment, it is possible to recursively consider the probability distribution for the utterance until the time t−1.

9. In the information processing apparatus according to the above embodiment, each of the machine learning models is learned using learning data different for each corresponding use scene, and the learning data includes a label indicating the use scene.

According to this embodiment, the machine learning model can be learned using the learning data reduced in capacity for each use scene, and the learning data can be used for learning by easily distributing the use scenes according to the label.

10. In the information processing apparatus according to claim 1, the identification unit identifies which scene the use scene of the target user is on a basis of information from a mobile object associated with the target user.

According to this embodiment, by identifying the use scene of the target user on a basis of information from the mobile object that is a use target, it is possible to determine the use scene accurately.

11. A control device (e.g., 30) of a mobile object (e.g., 710) in the above embodiment is a control device of a mobile object that is controllable on the basis of an instruction by an utterance of a user, the control device comprising:
an identification unit (e.g., 30, S604) configured to identify which scene a use scene of a target user is among a plurality of use scenes in a case where the mobile object is used;
an acquisition unit (e.g., 30, S606) configured to acquire utterance information of the target user;
a selection unit (e.g., 30, S605) configured to select a different machine learning model according to the identified use scene of the target user; and
an estimation unit (e.g., 30, S607) configured to estimate an intent of an utterance of the target user by using the selected machine learning model.

According to this embodiment, in the control of the mobile object by the utterance, the classification of the utterance intent can be provided by the model constructed by the smaller-scale learning.

The invention is not limited to the foregoing embodiments, and various variations/changes are possible within the spirit of the invention.

What is claimed is:

1. An information processing apparatus capable of controlling a self-driving vehicle on the basis of an instruction by an utterance of a user, the information processing apparatus comprising:
one or more processors; and
a memory storing instructions which, when the instructions are executed by the one or more processors, cause the information processing apparatus to:
identify a use scene of a target user among a plurality of use scenes, wherein each of the use scenes is a state of a user comprising a state before boarding, a state during boarding, or a state after alighting a self-driving vehicle;
acquire utterance information of the target user;
select a different machine learning model from a plurality of machine learning models according to the identified use scene of the target user, wherein each one of the machine learning models relates to a corresponding one of the state before boarding, the state during boarding, or the state after alighting the self-driving vehicle; and
estimate an intent of an utterance of the target user by using the selected machine learning model.

2. The information processing apparatus according to claim 1, wherein
each one of the machine learning models has a different intent class to be estimated for each of the use scenes with which the respective machine learning models are associated.

3. The information processing apparatus according to claim 2, wherein
the instructions cause the information processing apparatus to estimate the intent of the target user by using one of the machine learning models that outputs the likelihood for predetermined intent classes among all intent classes associated with the plurality of use scenes.

4. The information processing apparatus according to claim 1, wherein
the instructions cause the information processing apparatus to estimate the intent of the utterance of the target user in consideration of calculation using an initial state probability distribution set to an intent class as a prior distribution to output of the selected machine learning model.

5. The information processing apparatus according to claim 4, wherein
the initial state probability distribution set as the prior distribution is separately determined for each of the use scenes.

6. The information processing apparatus according to claim 1, wherein
the instructions cause the information processing apparatus to estimate the intent of the utterance of the target user in consideration of calculation using a state transition probability distribution between intent classes to output of the selected machine learning model.

7. The information processing apparatus according to claim 6, wherein
the state transition probability distribution is separately determined for each one of the use scenes.

8. The information processing apparatus according to claim 1, wherein
in a case where an intent of an utterance at time t is estimated, the instructions cause the information processing apparatus to estimate the intent of the utterance of the target user in consideration of an estimation result estimated for an utterance immediately before the utterance at the time t to output of the selected machine learning model.

9. The information processing apparatus according to claim 1, wherein
each of the machine learning models is learned using learning data different for each corresponding ones of the use scenes, and the learning data includes a label indicating the corresponding one of the use scenes.

10. The information processing apparatus according to claim 1, wherein
the instructions cause the information processing apparatus to identify one of the use scenes of the target user on a basis of information from a vehicle associated with the target user.

11. An information processing method in an information processing apparatus capable of controlling a self-driving vehicle on the basis of an instruction by an utterance of a user, the information processing method comprising:
identifying a use scene of a target user among a plurality of use scenes, wherein each of the use scenes is a state of a user comprising a state before boarding, a state during boarding, or a state after alighting a self-driving vehicle;
acquiring utterance information of the target user;
selecting a different machine learning model from a plurality of machine learning models according to the identified use scene of the target user, wherein each one of the machine learning models relates to a corresponding one of the state before boarding, the state during boarding, or the state after alighting the self-driving vehicle; and estimating an intent of an utterance of the target user by using the selected machine learning model.

12. A control device of a self-driving vehicle that is controllable on the basis of an instruction by an utterance of a user, the control device comprising:

one or more processors; and a memory storing instructions which, when the instructions are executed by the one or more processors, cause the control device to:

identify a use scene of a target user among a plurality of use scenes, wherein each of the use scenes is a state of a user comprising a state before boarding, a state during boarding, or a state after alighting a self-driving vehicle;

acquire utterance information of the target user;

select a different machine learning model from a plurality of machine learning models according to the identified use scene of the target user, wherein each one of the machine learning models relates to a corresponding one of the state before boarding, the state during boarding, or the state after alighting the self-driving vehicle; and estimate an intent of an utterance of the target user by using the selected machine learning model.

13. A method for controlling a self-driving vehicle that is controllable on the basis of an instruction by an utterance of a user, the method comprising:

identifying a use scene of a target user among a plurality of use scenes, wherein each of the use scenes is a state of a user comprising a state before boarding, a state during boarding, or a state after alighting a self-driving vehicle;

acquiring utterance information of the target user;

selecting a different machine learning model from a plurality of machine learning models according to the identified use scene of the target user, wherein each one of the machine learning models relates to a corresponding one of the state before boarding, the state during boarding, or the state after alighting the self-driving vehicle; and estimating an intent of an utterance of the target user by using the selected machine learning model.

\* \* \* \* \*